United States Patent
Hernandez Mascarell et al.

(10) Patent No.: US 9,273,671 B2
(45) Date of Patent: Mar. 1, 2016

(54) METHOD FOR THE IDENTIFICATION OF THE DRIVE TRAIN MAIN FREQUENCY IN A WIND TURBINE

(75) Inventors: Octavio Hernandez Mascarell, Madrid (ES); Jaime Suarez Aizpun, Madrid (ES); Jorn Klaas Gruber, Madrid (ES); Carlos Pizarro De La Fuente, Madrid (ES)

(73) Assignee: GAMESA INNOVATION & TECHNOLOGY, S.L., Sarriguren (Navarra) (ES)

( * ) Notice: Subject to any disclaimer, the term of this patent is extended or adjusted under 35 U.S.C. 154(b) by 819 days.

(21) Appl. No.: 13/532,987

(22) Filed: Jun. 26, 2012

(65) Prior Publication Data

US 2013/0001945 A1    Jan. 3, 2013

(30) Foreign Application Priority Data

Jun. 28, 2011    (ES) .................................. 201100728

(51) Int. Cl.
*F03D 7/00*    (2006.01)
*F03D 7/02*    (2006.01)
*F03D 11/00*    (2006.01)

(52) U.S. Cl.
CPC .......... *F03D 7/0296* (2013.01); *F03D 11/0091* (2013.01); *F05B 2270/334* (2013.01); *Y02E 10/722* (2013.01); *Y02E 10/723* (2013.01)

(58) Field of Classification Search
CPC . F03D 7/0269; F03D 11/0091; Y02E 10/723; Y02E 10/722; F05B 2270/334
See application file for complete search history.

(56) References Cited

U.S. PATENT DOCUMENTS

| | | | |
|---|---|---|---|
| 2005/0253543 A1* | 11/2005 | Soudier et al. | 318/432 |
| 2006/0066111 A1 | 3/2006 | Suryanarayanan et al. | |
| 2008/0265846 A1* | 10/2008 | Laubrock et al. | 322/29 |
| 2009/0185901 A1* | 7/2009 | Nielsen et al. | 416/1 |

OTHER PUBLICATIONS

Zhang, F., Leithead, W.E. and Anaya-Lara, O., Combined Controller Design of Power System Stabilizer and Wind Turbine Drive-train Damping Filter, Sep. 8, 2012, International Conference on Sustainable Power Generation and Supply (SUPERGEN 2012), pp. 1-6.*
Xing, Zuo-xia et al., Damping Control Study of the Drive Train of DFIG Wind Turbines, Oct. 16, 2009, International Conference on Energy and Environment Technology (ICEET '09), vol. 1, pp. 576-579.*

* cited by examiner

*Primary Examiner* — Mischita Henson
(74) *Attorney, Agent, or Firm* — Ladas & Parry LLP

(57) ABSTRACT

Method for the identification in operation of the drive train main vibration frequency of a wind turbine, comprising online steps of: a) obtaining a input signal (r) of the generator speed (Ω); b) filtering the generator speed input signal (r) for obtaining a generator speed signal (r1) in a suitable band for representing the oscillating signal (o) comprised in the input signal (r) of the generator speed (Ω); c) extracting the drive train main vibration frequency (f) from said filtered signal (r1). The invention also comprise a method of damping the drive train vibrations of a wind turbine comprising steps of setting the generator torque reference ($Tr_{ref}$) as a function of the generator speed (Ω) and of the drive train main vibration frequency (f) identified by the above mentioned method and wind turbine control system implementing said damping method.

6 Claims, 2 Drawing Sheets

1

METHOD FOR THE IDENTIFICATION OF THE DRIVE TRAIN MAIN FREQUENCY IN A WIND TURBINE

FIELD OF THE INVENTION

The invention relates to the damping of the drive train vibrations in wind turbines and, more in particular, to the identification of the drive train main frequency vibration.

BACKGROUND

Wind turbines are devices that convert mechanical wind energy to electrical energy. A typical wind turbine includes a nacelle mounted on a tower housing a drive train for transmitting the rotation of a rotor to an electric generator and other components such as a yaw drive which orientates the wind turbine, several actuators and sensors and a brake. The rotor supports a number of blades that capture the kinetic energy of the wind and cause the drive train rotational motion. The rotor blades have an aerodynamic shape such that when a wind blows across the surface of the blade, a lift force is generated causing the rotation of a shaft which is connected—directly or through a gearing arrangement—to the electrical generator located inside the nacelle. The amount of energy produced by wind turbines depends on the rotor blade sweeping surface that receives the action from the wind and consequently increasing the length of the blades leads normally to an increase of the power output of the wind turbine. The blades are controlled to stay in autorotation regime during normal phase, and its attitude depends on the wind intensity.

The dynamic coupling of the first symmetric in-plane mode of the 3 bladed rotor with the drive-train main frequency results in a coupled mode which is practically undamped in the wind turbine operation. This coupled mode may even be excited when operating at nominal power for high wind speeds leading to unaffordable loading on the drive-train. A wind turbine control operation without considering such dynamics can easily lead to damaging levels of fatigue loading on the gearbox.

The prior art teaches the use of the generator torque reference for damping said vibrations. This technique is highly dependant of a good identification of the drive train main frequency vibrations.

US 2006/0066111 discloses a vibration damping technique for variable speed wind turbines that not only aids damping of drive train vibrations caused by variation in wind speed, but also mitigates tower loads caused by side-to-side oscillations of the tower. Further, the technique advantageously reduces power fluctuations of the generator coupled to the wind turbine rotor. Said vibrations are determined as a function of the rotor speed using Fourier transforms in real-time operation.

A drawback of said proposal regarding particularly to the identification of the drive train vibrations is that the Fourier transforms require time windows of data of a certain size that may cause important delays in the processing of the generator speed signal.

The present invention focuses on finding a solution for said drawback.

SUMMARY OF THE INVENTION

An object of the present invention is to provide an online identification of the drive train main frequency in a wind turbine for an enhancement of the drive train damping.

In one aspect, this and other objects are met by a method for the identification in operation of the drive train main vibration frequency of a wind turbine, comprising online steps of: a) obtaining a input signal r of the generator speed $\Omega$; b) filtering the generator speed input signal r for obtaining a generator speed signal r1 in a suitable band for representing the oscillating signal o comprised in the input signal r of the generator speed $\Omega$; c) extracting the drive train main vibration frequency f from said filtered signal r1.

In embodiments of the invention said suitable band in said step b) is the better band, among a predetermined number of bands, for taking into account the oscillating signal o comprised in the input signal r of the generator speed $\Omega$ and, particularly, the band that, representing said input signal r as a filtered signal s plus an oscillating signal o of a frequency $f_i + \Delta f_i$, being $f_i$ the central frequency of the each band, achieves a minimum value of $\Delta f_i$. Hereby it is provided an online adaptive method for obtaining the drive train main frequency.

In embodiments of the invention, the method also includes a first step where said input signal r is obtained as a filtered signal of the raw generator speed signal r0 in a predetermined frequency interval, preferably in the interval 1-2.5 Hz. Hereby it is provided an optimized online adaptive method for obtaining the drive train main frequency.

In embodiments of the invention said predetermined number of bands is five, covering in equally dimensioned intervals a frequency range between 1.45-2.05 Hz. Hereby it is provided a suitable number of bands for providing a good response time for the calculation of the drive train main frequency.

In another aspect, the above-mentioned objects are met by a method of damping the drive train vibrations of a wind turbine comprising steps of setting the generator torque reference $Tr_{ref}$ as a function of the generator speed $\Omega$ and of the drive train main vibration frequency f identified by the above-mentioned method.

In another aspect, the above-mentioned objects are met by a wind turbine control system connected to measuring devices of, at least, wind speed V, generator speed $\Omega$, pitch angle $\theta$ of each blade, power P and to, at least, pitch and torque control actuators; the wind turbine control system being arranged for performing a regulation of the wind turbine according to a predetermined power curve 25 for wind speeds below the cut-out wind speed $V_{out}$; the wind turbine control system being also arranged for implementing the above-mentioned damping method.

Other features and advantages of the present invention will be understood from the following detailed description in relation with the enclosed drawings.

DETAILED DESCRIPTION OF PREFERRED EMBODIMENTS

Figure 1:
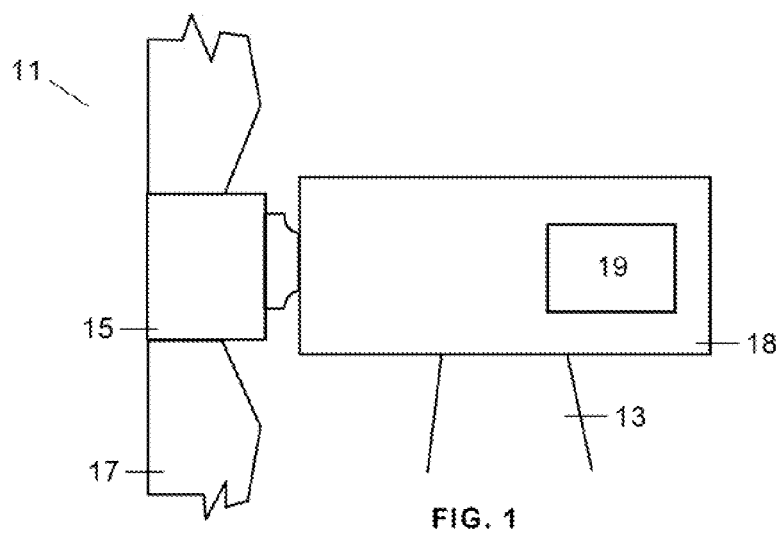
FIG. 1 is a schematic section side view of a wind turbine.

A typical wind turbine 11 comprises a tower 13 supporting a nacelle 18 housing a generator 19 for converting the rotational energy of the wind turbine rotor into electrical energy. The wind turbine rotor comprises a rotor hub 15 and, typically, three blades 17. The rotor hub 15 is connected either directly or through a gearbox to the generator 19 of the wind turbine for transferring the torque generated by the rotor 15 to the generator 19 and increase the shaft speed in order to achieve a suitable rotational speed of the generator rotor.

The power output from a modern wind turbine is typically controlled by means of a control system for regulating the pitch angle of the rotor blades and the generator torque. The rotor rotational speed and power output of the wind turbine can hereby be initially controlled e.g. before a transfer to a utility grid through a converter.

The basic aim of the methods of operation of variable speed wind turbines is to achieve an operation at the ideal aerodynamic output for as much time as possible.

As it is known, the kinetic energy associated with the incoming wind depends on the area swept by the rotor blades, on the air density and on the cube of the wind speed and it is considered that wind turbines can extract up to 59% of this energy. Accordingly, the capacity of each wind turbine to approach this limit is represented by the so-called power coefficient Cp which is determined by its aerodynamic characteristics, particularly by its tip-speed ratio λ which is defined as the relationship between the tangential speed of the blade tip and the speed of the incident wind. If this ratio is kept at its optimal value, so that the rotor speed follows the wind speed, the maximum power coefficient Cp of the wind turbine is obtained, achieving an extremely efficient energy conversion.

The control strategy generally used in variable speed wind turbines is based on electrically adjusting the generator's torque to achieve the maximum output and this is carried out using a controller which receives signals indicating the speed of the generator and the power produced by the generator and which provides a torque reference signal to the converter to obtain the required power.

Accordingly, the wind turbine controller uses a curve which defines the desired functional relationship between power and generator speed to achieve ideal output.

Figure 2:
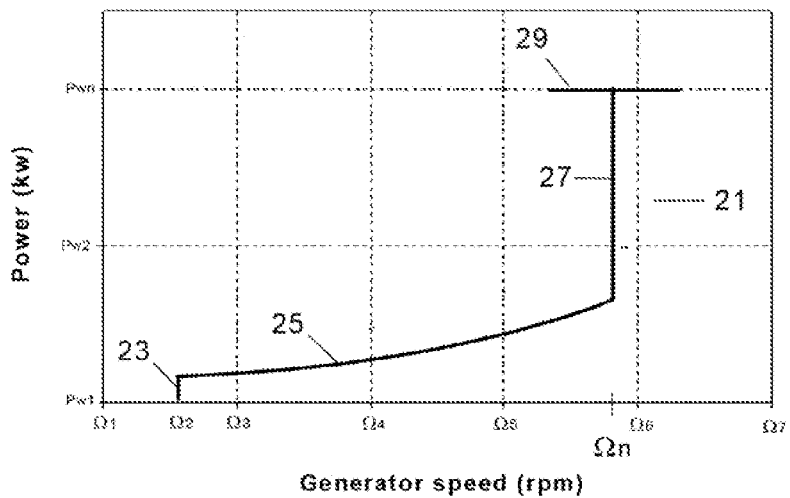
FIG. 2 shows a prior art Power vs. Generator speed curve used for controlling a variable speed wind turbine.
Figure 3:
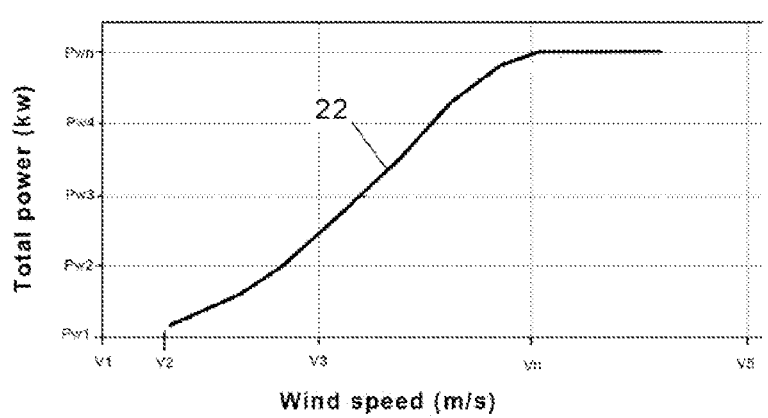
FIG. 3 shows a typical power curve of a wind turbine.

For a better understanding of the present invention a brief description of a typical prior art Power vs. Generator speed 21 shown in FIG. 2 and of the resulting Power vs. Wind speed curve shown in FIG. 3 follows.

The Power vs. Generator speed curve shown in FIG. 2 comprises a first sub-nominal zone 23 where the wind speed attains the minimum level for starting the wind turbine operation. In this zone, the wind turbine control is limited since the wind turbine can not capture the maximum energy. The second sub-nominal zone 25 corresponds to wind speeds in a certain range where generator speed increases and the turbine is running with optimum power coefficient Cp. The third sub-nominal zone 27 corresponds to wind speeds in a certain range where the generator speed is kept constant at the nominal generator speed $\Omega_n$ while power increases up to the nominal power Pwn. Within this zone the pitch angle is fixed and the generator speed is controlled via torque. At the nominal zone 29 the full load wind turbine operation at nominal power Pwn takes place under pitch control to avoid overloads.

In ideal conditions, the resulting average power curve will be curve 22 in FIG. 3 that shows that the power production P increases from a minimum wind speed $V_2$ to the nominal wind speed $V_n$ and then remain constant in the nominal power value Pwn up to the cut-out wind speed. This curve defines the desired functional relationship between power and speed to achieve ideal output and therefore the wind turbine control system shall be accordingly arranged.

For implementing said regulation a control unit receives input data such as wind speed V, generator speed Ω, pitch angle θ, power Pw from well known measuring devices and send output data $\theta_{ref}$, $Tr_{ref}$ to, respectively, the pitch actuator system for changing the angular position of the blades 17 and to a generator command unit for changing the reference for the power production.

Figure 4:
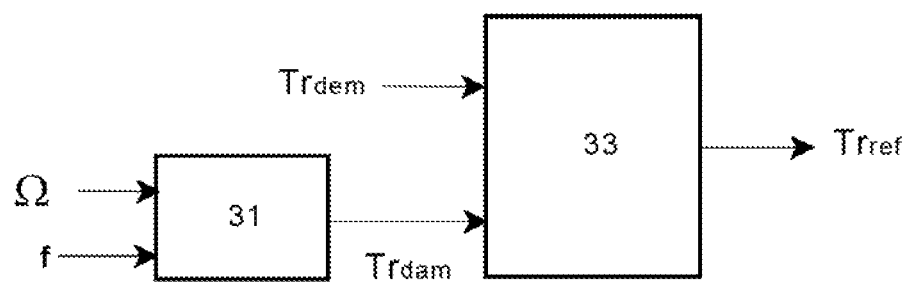
FIG. 4 is a schematic block diagram of a generator torque regulation including a damping of the drive train vibration.

In reference to FIG. 4, the basic inputs to a torque controller 33 provided with means for damping the drive train vibrations are a torque demand $Tr_{dem}$ according to the Power vs. Generator speed curve 21 and a torque $Tr_{dam}$ according to the damping needs of the drive train determined in block 31 as a function of generator speed Ω and of the drive train main frequency f. The output is a torque reference $Tr_{ref}$ for the generator command unit.

Figure 5:
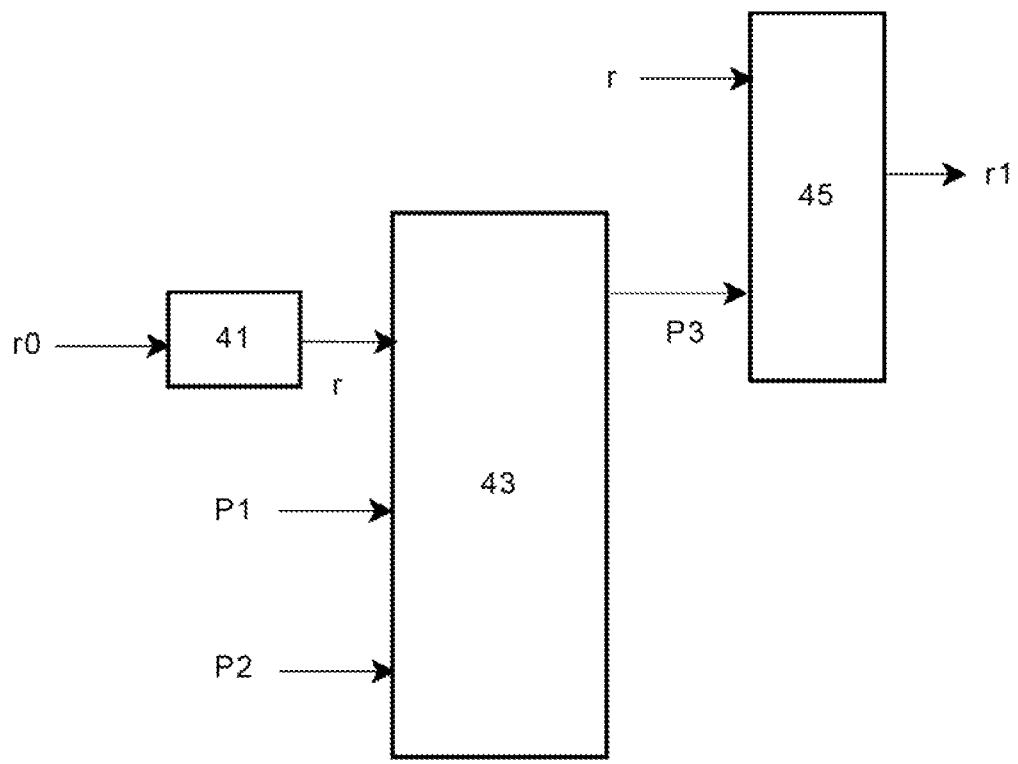
FIG. 5 is a schematic block diagram of the identification of the drive train main frequency according to the present invention.

This invention is focused in the online identification of the drive train main frequency f when the wind turbine is in operation and comprises the following steps in a preferred embodiment (see FIG. 5).

In a first step, the raw generator speed signal r0 provided by the above-mentioned measuring device of the generator speed Ω is filtered in block 41 for obtaining an input signal r in a predetermined frequency interval, preferably a 1-2.5 Hz interval, to avoid signal perturbations.

In a second step, the better frequency band (between a predetermined number of bands defined by the variable P2), defined by the variable P3, representing the oscillating signal o comprised in the input signal r of the generator speed Ω is obtained in block 43.

The input signal r can be represented in each of said bands as a filtered signal s plus an oscillation signal o with unknown amplitude and phase and with a known frequency with a certain uncertainty (the central frequency of each sub-band plus an offset). The filtered signal s can be obtained then by subtracting the estimated oscillation from the input signal:

$$r(kT) = s(kT) + \alpha(kT)\cos(2\pi(f+\Delta f)kT + \phi(kT))$$

$$\hat{s}(kT) = r(kT) - \hat{\alpha}(kT)\cos(2\pi(f+\Delta f)kT + \hat{\phi}(kT)) \quad \text{Ec. 1}$$

The values of the estimated amplitude (rpm) and phase (radians) can be calculated step by step as shown below:

$$\hat{\alpha}(k+1) = \hat{\alpha}(k) + \mu_\alpha \cdot \hat{s}(k) \cdot \cos(2\pi \cdot f \cdot k + \hat{\phi}(k))$$

$$\hat{\phi}(k+1) = \hat{\phi}(k) - \mu_\phi \hat{s}(k) \cdot \text{sen}(2\pi \cdot f \cdot k + \hat{\phi}(k)) \quad \text{Ec. 2}$$

In this expression, $\mu_\alpha$ and $\mu_\phi$ (dimensionless) are the step size to define the convergence time and the stability of the algorithm. They must be experimentally calculated. All the parameters needed for this step are defined in variable P1.

The expressions above are valid if and only if Δf/f<<1. Note that the phase estimation owns Δf so a greater error in Δf will affect to such estimation and also to the amplitude estimation according to Ec. 2. The Δf can be approximated by calculating the slope of the phase estimation.

The band where the oscillation is occurring is determined calculating the Δf in each band. The minimum Δf will determine the band to be filtered.

Said filtering is done in a third step in block 45 obtaining the signal r1 needed for obtaining the drive train main frequency f.

In a preferred embodiment said sub-bands are the following:
Band 0: 1.45-1.65 Hz
Band 1: 1.55-1.75 Hz
Band 2: 1.65-1.85 Hz
Band 3: 1.75-1.95 Hz Although the present invention has been fully described in connection with preferred embodiments, it is evident that modifications may be introduced within the scope thereof, not considering this as limited by these embodiments, but by the contents of the following claims.

The invention claimed is:

1. A method for the identification in operation of the drive train main vibration frequency (f) of a wind turbine, comprising online steps of:
   a) obtaining an input signal (r) of a generator speed ($\Omega$);
   b) filtering the input signal (r) to obtain a generator speed signal (r1) in a suitable band for representing an oscillating signal (o) comprised in the input signal (r), wherein the suitable band is a better band, among a predetermined number of bands, for taking into account the oscillating signal (o) comprised in the input signal (r), and wherein the predetermined number of bands is five, covering in equally dimensioned intervals a frequency range between 1.45-2.05 Hz;
   c) extracting the drive train main vibration frequency (f) from the generator speed signal (r1); and
   d) using the drive train main vibration frequency (f) for damping the drive train vibrations of a wind turbine.

2. The method according to claim 1, wherein the better band is a band that, representing the input signal (r) as a filtered signal (s) plus an oscillating signal (o) of a frequency (fi+$\Delta$fi), wherein (fi) is a central frequency of each band, achieves a minimum value of ($\Delta$fi).

3. The method according to claim 1, further comprising a first step where said input signal (r) is obtained as a filtered signal of a raw generator speed signal (r0) in a predetermined frequency interval.

4. The method according to claim 3, wherein said predetermined frequency interval is 1-2.5 Hz.

5. A method of damping the drive train vibrations of a wind turbine, comprising steps of:
   a) setting a generator torque reference ($Tr_{ref}$) as a function of the generator speed ($\Omega$); and
   b) setting the drive train main vibration frequency (f), wherein the main vibration frequency (f) is identified by the method according to claim 1.

6. A wind turbine control system that is connected to measuring devices of at least wind speed (V), generator speed ($\Omega$), pitch angle ($\theta$) of each blade, power (P), and to at least pitch and torque control actuators,
   wherein the wind turbine control system is arranged for performing a regulation of a wind turbine according to a predetermined power curve (25) for wind speeds below a cut-out wind speed ($V_{out}$), and
   wherein said wind turbine control system is also arranged for implementing the method according to claim 5.

* * * * *